W. ADELMAN.
TOOL FOR CUTTING FINGER RINGS.
APPLICATION FILED APR. 8, 1909.
933,043. Patented Sept. 7, 1909.
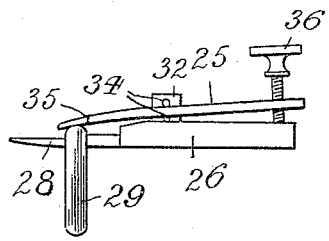
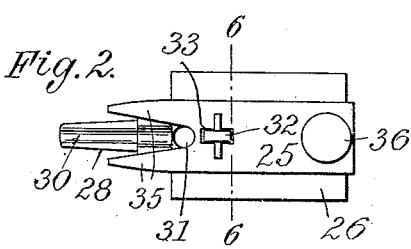
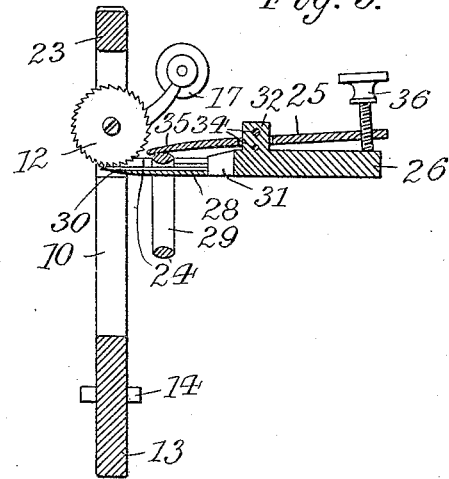
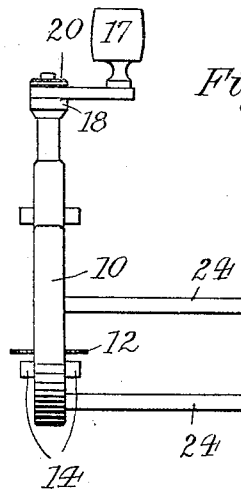
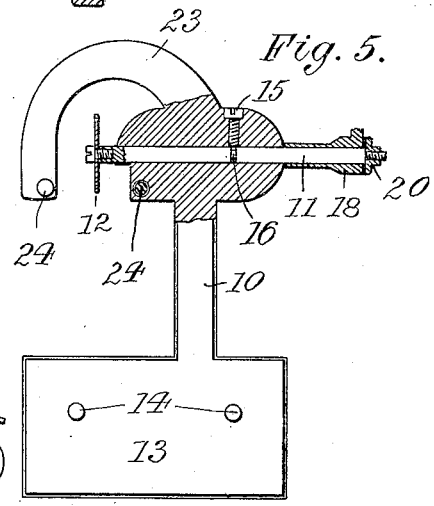
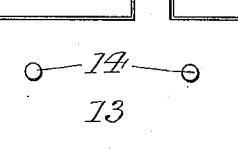
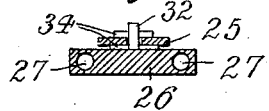
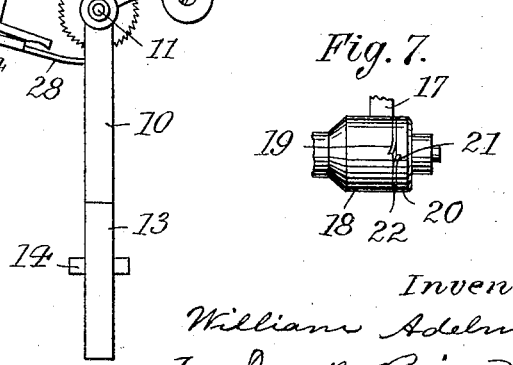
Witnesses:
Arthur E. Zumpe
H. R. Schulz
Inventor:
William Adelman
By Frank V. Briesen Atty.

UNITED STATES PATENT OFFICE.

WILLIAM ADELMAN, OF HOBOKEN, NEW JERSEY.

TOOL FOR CUTTING FINGER-RINGS.

933,043.

Specification of Letters Patent.

Patented Sept. 7, 1909.

Application filed April 8, 1909. Serial No. 488,677.

*To all whom it may concern:*

Be it known that I, WILLIAM ADELMAN, a citizen of the United States, residing at Hoboken, Hudson county, State of New Jersey, have invented new and useful Improvements in Tools for Cutting Finger-Rings, of which the following is a specification.

This invention relates to a novel tool for cutting finger rings from the fingers in case they cannot be drawn over the knuckles.

In the accompanying drawing: Figure 1 is a side view of a clamp forming part of the tool; Fig. 2 a plan thereof; Fig. 3 a vertical longitudinal section of the tool complete; Fig. 4 a plan of the saw-carrying frame; Fig. 5 a side view, partly in section thereof; Fig. 6 a cross section on line 6—6, Fig. 2; Fig. 7 a detail of the saw spindle coupling, and Fig. 8 a side view of a modification of the tool.

In a frame 10 is journaled the spindle 11 of a circular saw 12. Frame 10 may be provided with a base 13 having laterally projecting pins 14 by which it may be supported upon the jaws of a vise. A screw 15 engaging a circumferential groove 16 of spindle 11 holds the latter against axial displacement. Spindle 11 may be rotated in one direction only by a crank handle 17, rotation in the opposite direction being prevented. To this effect handle 17 is provided with a hub 18 fitted loosely upon spindle 11 and having a notched edge 19. At a slight distance from hub 18 there is fast on spindle 11, a collar 20 having notched edge 21. Between hub 18 and collar 20 is interposed an annular resilient split disk 22 having divergings ends which engage notched edges 19, 21, respectively. When turning handle 17 forward, hub 18, by disk 22 and collar 20, will rotate spindle 11, while, when turning the handle backward, hub 18 will turn loosely on the spindle.

Frame 10 has a goose-neck 23 that overhangs saw 12 and provides the necessary clearance for the latter. From goose-neck 23 and the body of frame 10, there extend at opposite sides of saw 12, a pair of horizontal guide rods 24 which project at right angles to the frame. Upon these guide rods is slidably mounted a clamp consisting of an upper movable jaw 25 and a lower relatively fixed jaw 26. The latter is provided with a pair of perforations 27 adapted for the reception of rods 24, and with a forwardly extending beveled guard 28. This guard is adapted to be interposed between the finger and the ring 29 to be cut therefrom, and is provided with a longitudinal groove 30 for accommodating saw 12. Back of guard 28, jaw 26 is perforated as at 31, for the discharge of the chips. From jaw 26 projects upwardly a post 32 entering an aperture 33 of movable jaw 25 and traversed by pins 34 above and below the latter. Post 32 constitutes a fulcrum for jaw 25, upon which the latter may be tilted against jaw 26. At its forward end, jaw 25 is forked as at 35, to straddle saw 12. The means for fixing jaw 25, consist of a set screw 36 tapped into the heel of jaw 25 and bearing upon jaw 26. In use, guard 28 is slipped between the finger and the ring 29 to be cut, and screw 36 is manipulated to force fork 35 upon the latter. The clamp thus charged, is slid along rods 24 until the ring encounters saw 12, which is then turned by handle 17, the clamp being, during the latter operation, advanced manually. In this way the ring may be readily slit and removed without being slipped over the knuckle, any accidental contact between the saw and the flesh, during the cutting operation, being effectively prevented.

In lieu of sliding the clamp along guide rods, it may be pivotally connected to the frame, as shown in Fig. 8. Here rods 24 are dispensed with, and lower jaw 26 is provided with an upwardly extending arm 37 fulcrumed at 38 to frame 10 and held against axial displacement by set screw 39. With this construction, the clamp is gradually tilted forward on its fulcrum during the cutting operation.

I claim:

1. In a device of the character described, a frame and a circular saw journaled therein, combined with a clamp movably secured to the frame and comprising a lower jaw having a forwardly extending guard and an upper jaw having a forwardly extending fork.

2. In a device of the character described, a frame and a circular saw journaled therein, combined with a clamp movably secured to the frame and comprising a lower jaw having a forwardly extending guard, an upper jaw pivoted to the lower jaw and having a forwardly extending fork, and a set screw tapped into the upper jaw and engaging the lower jaw.

Signed by me at New York city, (Manhattan,) N. Y., this 6th day of April, 1909.

WILLIAM ADELMAN.

Witnesses:
   EDWARD SCHORR,
   FRANK V. BRIESEN.